Figure 1:
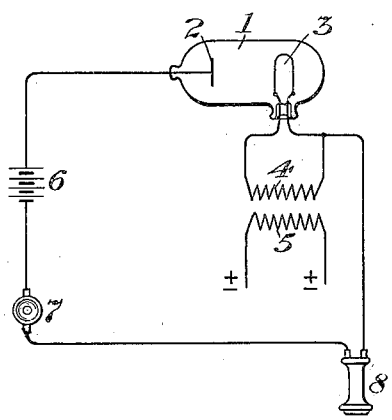

Feb. 23, 1926.

P. C. HEWITT

ELECTRIC SWITCH

Filed March 17, 1916   2 Sheets-Sheet 1

1,574,194

Feb. 23, 1926.
P. C. HEWITT
1,574,194
ELECTRIC SWITCH
Filed March 17, 1916    2 Sheets-Sheet 2
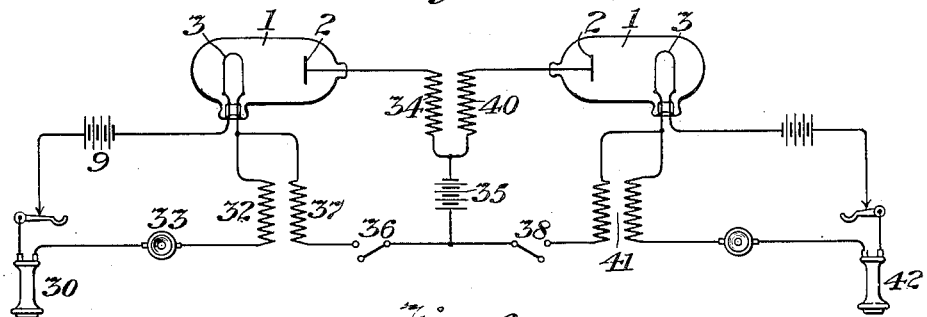
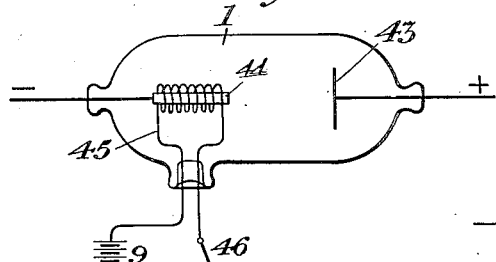
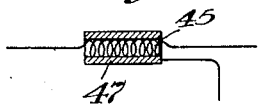
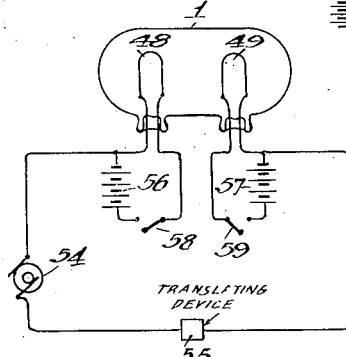
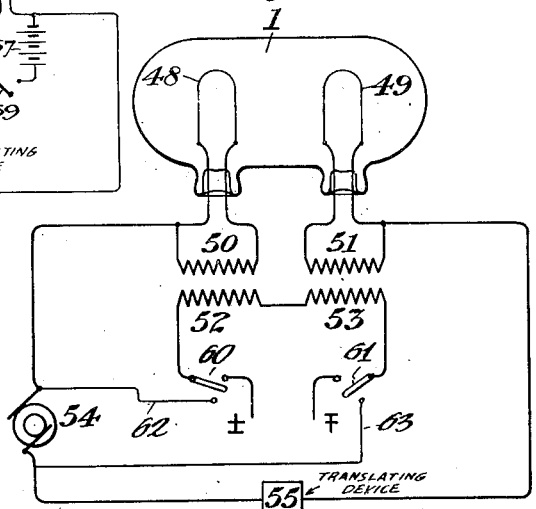
Inventor
Peter Cooper Hewitt
By his Attorney Patented Feb. 23, 1926.

1,574,194

UNITED STATES PATENT OFFICE.

PETER COOPER HEWITT, OF RINGWOOD MANOR, NEW JERSEY, ASSIGNOR TO COOPER HEWITT ELECTRIC COMPANY, OF HOBOKEN, NEW JERSEY, A CORPORATION OF NEW JERSEY.

ELECTRIC SWITCH.

Application filed March 17, 1916. Serial No. 84,785.

*To all whom it may concern:*

Be it known that I, PETER COOPER HEWITT, a citizen of the United States, and resident of Ringwood Manor, county of Passaic, State of New Jersey, have invented certain new and useful Improvements in Electric Switches, of which the following is a specification.

This invention provides means for utilizing certain electrical reactions of an inclosed gas or vapor or vacuum apparatus for completing, modifying or opening an electric circuit in which it is included, so as to permit, at will, passage, control, or discontinuance of current flow in the circuit by providing special means for the control of the reactions at the negative electrode.

The invention contemplates the use of reactions existing at and associated with an electrode acting as a negative electrode in a gas or vapor or vacuum device for the purpose of producing the effects of a switch or circuit controller, together with certain attendant features.

A negative electrode normally presents a high initial reluctance to starting which prevents current flow through the device and its circuit when included in a circuit containing a source of moderate electro-motive-force. This reluctance may be modified in various ways. If the electrode which is to be conducting or non-conducting is of mercury, the reluctance may be modified in various ways and be broken down and maintained in that condition by the use of an auxiliary keep-alive circuit, such as is well known, or the electrode may be of any substance heated to a temperature at which it will pass current as a cathode. An electrode that will act as a negative will also act as a positive on reversal of potential.

One of the objects of this invention is, while providing independent means for heating a negative electrode, to utilize the modifying effect of heat on the negative electrode with respect to the negative electrode reluctance, for permitting, controlling and stopping current flow in a circuit which includes the electrode. The mode of heating the negative electrode may consist in constructing and heating the electrode in the same manner as an electric lamp filament is heated; that is, by causing it to be included in a circuit acted upon for this purpose by a source of electro-motive-force.

Or, the electrode may be heated by being placed in close proximity to a body heated after the manner of a filament, and the heating accomplished somewhat in the same manner as the preliminary heating of a Nernst lamp glower.

Another object of this invention is to complete and open the electric circuit by the movement of an evacuated container having fluid electrodes, one of which (the cathode) is maintained in a conducting or non-conducting condition, depending on the position of the container. This is especially valuable where the current flowing in the circuit to be controlled is of considerable magnitude.

A negative electrode consisting of a conductor included in a container which also has within it a positive electrode and through which the electric circuit is completed, presents, when cold, a prohibitive barrier to the passage of current in a circuit having normal electro-motive-force. By normal electro-motive-force is meant an electro-motive-force approximately the same as that upon which the apparatus is to be operated. Upon heating the negative electrode by passage of electric current through it from an independent source or otherwise, when a certain temperature is reached, somewhere about the temperature of incandescence, positive current will flow from the positive electrode to it and in the circuit including the electrodes and if this circuit be of relatively or substantially small resistance, the chief resistance will reside at the negative electrode and its resistance will permit only a definite amount of current to pass, even though the electro-motive-force of the circuit be increased and varied through a wide range. The current flow, however, will be increased on further heating, the electrode presenting the same resistance characteristics but permitting an increased current flow. The amount of current thus permitted to pass is increased as the heated surface of the negative electrode is enlarged and the current flow is, therefore, determined by the surface area of the heated surface and the temperature to which it is raised. The definite value or limit of current passed by a negative electrode may be termed saturation current, and, where the amount of current is limited by the other characteristics of the circuit and not by saturation, current of the negative electrode, and the current is below the saturation value, the current in the circuit will be determined by the characteristics of the circuit independently of the negative electrode.

I propose utilizing these characteristics in connection with electric circuits, and, particularly, telephone and telegraph circuits and in connection with multiplex communicating circuits for the purpose of connecting and interconnecting circuits for intercommunication; and I also propose to provide means for making and breaking circuit connections by heating or not heating the negative electrode by a separate circuit or source, thereby causing the negative electrode to perform the same function as a switch without moving contact and to provide other features resulting from the inclusion of a gas, vapor or vacuum member in the circuit; and I also provide means for definitely limiting current flow in the circuit, which means depend upon the adjustment of the limit by means of the temperature to which the negative electrode is heated and its heated area. This same arrangement may be adapted to certain power circuits. Any suitable source of current, either direct or alternating may be used for heating the negative electrode. In case alternating current is used for this purpose and if the period of alternation lies within the sound period, its note may be objectionable or create objectionable disturbances in the circuit. Therefore, for use in connection with such circuits and telephone circuits, I prefer to use alternating currents of a period higher than audibility for the circuit used. In this case, I avoid sound disturbances as well as other electrical disturbances, as ordinary circuits are not conductive for frequencies of such short time period.

For power circuits the apparatus with the fluid electrodes has certain advantages.

In case the circuit in which the device is included is used for transmitting electrical variations, the invention contemplates the use of a circuit, for the heating circuit, of such time period as not to affect the main circuit by variations therein. It is possible that the heating circuit may be of very low frequency or have such characteristics as not to affect the other circuit objectionably, by reason of other mutually arranged electrical factors of the circuits. A rapid period of alternating current source is advantageous to use for heating the negative electrode, as the current may readily be conveyed from a primary to a secondary coil by causing the approach of one to the other or by including one within the other, thus doing away with the necessity for a make and break in the circuit; and the size of the coil may be very small, or of a few turns.

The invention is suited for use with either alternating or direct current systems. In the case of alternating systems, the electrodes employed should be capable of acting either as positive or negative electrodes and the means utilized for causing them to act as cathodes should be independent of each other.

Figure 2:
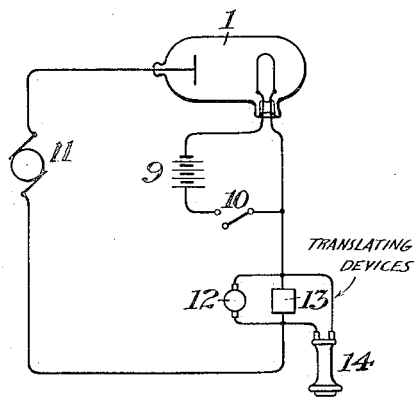
Figure 3:
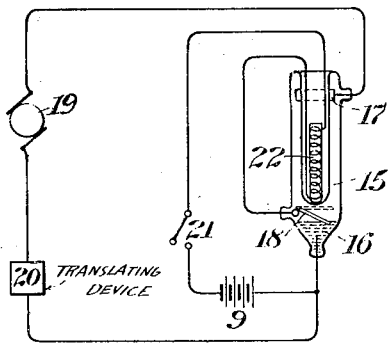
Figure 4:
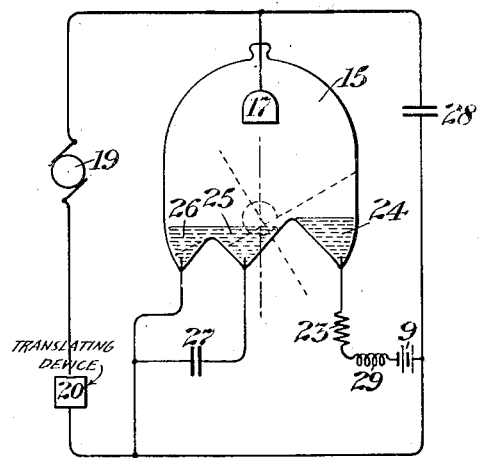

My invention is illustrated in the accompanying drawings in which the first six figures are diagrams of electric systems in which the current is unidirectional; Figure 1 being a simple telephone circuit in which the cathode of the vacuum, gas or vapor device is operated from an alternating current source; Figure 2 is a simple electric circuit in which the cathode of the vacuum, gas or vapor device is operated from a direct current source; Figure 3 shows a similar electric circuit including one of my devices, the opening and closing of the circuit being effected by the movement of an electrode independently of the movement of the container; Figure 4 shows an arrangement wherein movement of the vacuum, gas or vapor device is availed of to open and close the circuit; Figure 5 shows the application of my invention to two elements of a common battery telephone system connected through a central station; and Figure 6 shows an arrangement for controlling the action of the cathode from an independent source of heat; Figure 7 is a detail view; Figure 8 is a diagram of my invention as applied to an alternating current system, the electrodes of the vacuum, gas or vapor device being operated from alternating current sources; and Figure 9 is a similar system in which the electrodes of the vacuum, gas or vapor device are operated from direct current sources.

Referring to the first figure of the drawings, 1, is an evacuated container having electrodes 2 and 3. Electrode 3 is made in the form of a filament and may be heated to the desired temperature by current from the secondary 4 of a transformer, the primary of which is movably mounted with respect to said secondary, as shown at 5. A source of direct current is shown at 6, a transmitting device at 7, and, 8, is a receiver of a telephone circuit. The action is as follows: When coil 5, which is suitably connected with a source of alternating current, is moved into operative relation to coil 4, current flows through filament electrode 3, heating the same, thereby constituting it a cathode, and allowing current to pass in the circuit 6, 7, 8, 3 and 2, then, if coil 5 be withdrawn current will cease to flow through filament 3 and the current through the telephone instruments will cease, the device 1, thus acting as a switch to close and open the telephone circuit.

In Figure 2 the action is the same except that the filament is heated or cooled by means of a battery 9, the flow of current from which is controlled by switch, 10. In this figure, 11, is a source of direct current, 12, 13 and 14 are translating devices which may be used singly or in combination.

In Figure 3 I show an evacuated container, 15, having a mercury electrode, 16, a main anode, 17, and an auxiliary anode, 18. The circuit to be controlled consists of generator, 19, translating device, 20, and leads therefrom to anode, 17, and mercury electrode, 16. To make the current flow, switch, 21, is closed. Current will then flow through battery 9, mercury electrode 16, auxiliary electrode 18, and winding, 22. This will cause the magnet to raise electrode 18 from the surface of the mercury, thereby springing an arc and constituting electrode 16 a cathode for main positive 17. Cessation of current flow in the auxiliary circuit will stop current flow in the main circuit. In Figure 4 I show means of accomplishing the same result by tilting the evacuated container 15 from the position illustrated in full lines to the position illustrated in dotted lines. As shown in full lines, current will flow from battery 9 through resistance, 23, electrode, 24, to electrode, 25, forming an arc from 24 to 25 which, together with electrode, 26, will be acting as a cathole. The arc so formed will form a kept-alive cathode for circuit 19, 17, 25 or 26. In the position as shown dotted, the fluid will be continuous from 24 to 25 which will tend to form an arc from 25 to 26. This arc will immediately be extinguished by the action of condenser 27. The purpose of condenser 28 is to prevent the continuation of current flow from electrodes 17 to 24 or 25, when the keep-alive arc has been extinguished. An inductance is shown at 29. In Figure 5, 1, 1, are evacuated containers having electrodes 2, 2, 3, 3. This shows two elements of a common battery telephone system. Each element is like the other and there may be any number. On removing telephone receiver 30 from its hook, 31, the circuit is closed and current flows from battery 9 through filament 3 and primary, 32, of a transformer and through transmitter, 33, and receiver, 30. Filament 3 is heated by the current flowing and acts as a cathode for circuit 2, 34, battery, 35, and switch, 36, when closed, and secondary coil, 37, which is in operative relation to the primary, 32. The speech variations caused by 33 will be reproduced through transformer coils, 32 and 37, in primary 34. When switches, 38 and 39 are closed, variations in primary 34 will be reproduced in secondary 40 and then similarly, as described, by means of transformer, 41, to the telephone receiver 42.

Figure 6 shows an evacuated container, 1, having an anode, 43, and a cathode, 44, which may be zirconia, or any other second class conductors such as are used for Nernst glowers. A coil of conducting material, 45, may be employed and this may be operated at a high temperature, thus maintaining the electrode 44 in condition to serve as a cathode. Battery 9 and switch, 46, complete the circuit through the heating element. This device will pass current when switch 46 is closed and will not pass current when switch 46 is open. Figure 7 is a modification of the cathode shown in Figure 6. The electrode 47 is here shown hollow with the heating element 45 inserted therein and preferably insulated therefrom. In Figure 8, 1 is an evacuated container having similar electrodes, 48, 49, of such a construction that they may be bought to incandescence to serve as cathodes. The means for heating here shown consists of windings 50 and 51 in operative relation to the windings 52 and 53 of a transformer supplied with alternating current. A source, 54, of alternating current is included in the circuit 54, 48, 49 and 55, which it is desired to control, and wherein is a translating device. Since electrodes 48 and 49, which are capable of acting as cathodes, will pass current equally in both directions and by regulating the temperature of these electrodes, the amount of current flowing in either direction can be controlled and if the current is below the saturation point of the electrodes, as cathodes, the device may be used as a simple switch by approaching or withdrawing the coils 52 and 53 which are movably mounted with respect to their secondaries, to and from the coils 50 and 51.

Manifestly, the windings 52 and 53 of the transformer may be fed from the source 54 by connecting switches 60 and 61 to lines 62 and 63; or, if preferred, the electrodes 48 and 49 may be heated by batteries 56 and 57, and switches 58 and 59, as shown, for example, in Figure 9.

I have shown in my Patents Nos. 799,050 and 799,052, issued September 12th, 1905, how an evacuated container with suitable electrodes may be used as a switch or circuit controller. My present invention relates to improvements on the invention set forth in the said patents.

I claim as my invention:

1. In a system of electrical distribution a switch comprising an evacuated container and electrodes therein, a direct current source leading to one of the electrodes through a transformer primary and leading in the opposite direction through the secondary of a second transformer into connection with a separate circuit having a primary cooperating with the secondary of the original circuit and included in a circuit having a source of direct current and a transmitting and a translating device, the source of direct current being connected to one of the electrodes so as to heat the same.

2. In a system of electrical distribution a switch comprising an evacuated container and electrodes therein, a direct current source leading to one of the electrodes through a transformer primary and leading in the opposite direction through the secondary of a second transformer into connection with a separate circuit having a primary cooperating with the secondary of the original circuit and included in a circuit having a source of direct current and a transmitting and a translating device, the source of direct current being connected to one of the electrodes so as to heat the same, all in combination with a similar system responding to the variations in the described circuit through the effect of the primary of the latter circuit acting upon a secondary in the other circuit.

Signed at New York in the county of New York and State of New York this 16th day of March A. D. 1916.

PETER COOPER HEWITT.